(12) United States Patent
Yamazaki et al.

(10) Patent No.: US 10,520,022 B2
(45) Date of Patent: Dec. 31, 2019

(54) LINEAR MOTION DEVICE

(71) Applicant: NIPPON BEARING CO., LTD., Ojiya-shi, Niigata (JP)

(72) Inventors: Toru Yamazaki, Ojiya (JP); Tomohiko Kikuchi, Ojiya (JP); Yusuke Ueki, Ojiya (JP); Masaki Kawamura, Ojiya (JP); Taku Koyama, Ojiya (JP)

(73) Assignee: NIPPON BEARING CO., LTD., Ojiya-shi, Niigata (JP)

( * ) Notice: Subject to any disclaimer, the term of this patent is extended or adjusted under 35 U.S.C. 154(b) by 0 days.

(21) Appl. No.: 16/316,779

(22) PCT Filed: Aug. 7, 2017

(86) PCT No.: PCT/JP2017/028575
§ 371 (c)(1),
(2) Date: Jan. 10, 2019

(87) PCT Pub. No.: WO2018/043045
PCT Pub. Date: Mar. 8, 2018

(65) Prior Publication Data
US 2019/0316631 A1    Oct. 17, 2019

(30) Foreign Application Priority Data

Sep. 2, 2016  (JP) .................. 2016-171692

(51) Int. Cl.
*F16C 29/06*    (2006.01)
(52) U.S. Cl.
CPC ........ *F16C 29/0607* (2013.01); *F16C 29/065* (2013.01); *F16C 29/0611* (2013.01); *F16C 29/0647* (2013.01)
(58) Field of Classification Search
CPC .............. F16C 29/0607; F16C 29/0611; F16C 29/065; F16C 29/0647
See application file for complete search history.

(56) References Cited

U.S. PATENT DOCUMENTS

| 7,802,921 B2 * | 9/2010 | Wu ..................... F16O 29/0611 384/44 |
| 8,177,432 B2 * | 5/2012 | Klein .................. F16O 29/0604 384/44 |

(Continued)

FOREIGN PATENT DOCUMENTS

| JP | 3-111143 A | 5/1991 |
| JP | 2001-82469 A | 3/2001 |

(Continued)

OTHER PUBLICATIONS

International Preliminary Report on patentability for PCT/JP2017/028575 drafted on Jun. 18, 2018.

(Continued)

*Primary Examiner* — Thomas R Hannon
(74) *Attorney, Agent, or Firm* — Muncy, Geissler, Olds & Lowe, P.C.

(57) ABSTRACT

Provided is a linear motion device having higher rigidity, higher load resistance, and superior guiding precision. In this linear motion device, a linearly moving element 2 that moves linearly relative to a rail element 1 is provided, load paths 4 through which rolling elements 3 move are provided between the rail element 1 and the linearly moving element 2, and endless rolling element circulation paths are formed in which the load paths 4 are made to communicate via return paths 5 with no-load paths 6, wherein the rolling elements 3 are cylinders of which the length is at least three times the diameter, the rolling elements 3 are configured so as to circulate through the endless rolling element circulation paths while being rotatably held by rolling element holders 10 configured by spacers 8 provided between adjacent rolling elements 3 and belt-shaped linking elements 9 that link spacers 8 together at both ends, the no-load paths 6 are formed by placing no-load path-constituting members 12 in linear holes 11 formed in the linearly moving element (Continued)

2, and the no-load path-constituting members 12 are configured such that the end surfaces of the rolling elements 3 are opened on the outward sides and the linking elements 9 of the rolling element holders 10 are exposed.

8 Claims, 7 Drawing Sheets

(56) References Cited

U.S. PATENT DOCUMENTS

| | | | | |
|---|---|---|---|---|
| 2015/0043843 A1* | 2/2015 | Horie | ............ | F16C 29/065 |
| | | | | 384/44 |
| 2015/0131930 A1* | 5/2015 | Liao | ............ | F16C 29/0666 |
| | | | | 384/44 |
| 2015/0159695 A1* | 6/2015 | Geka | ............ | F16C 33/3706 |
| | | | | 384/44 |
| 2015/0369282 A1 | 12/2015 | Takahashi et al. | | |

FOREIGN PATENT DOCUMENTS

| | | |
|---|---|---|
| JP | 2002-310151 A | 10/2002 |
| JP | 2009-162279 A | 7/2009 |
| JP | 2012-117582 A | 6/2012 |
| JP | 2013-200036 A | 10/2013 |
| JP | 2014-167348 A | 9/2014 |

OTHER PUBLICATIONS

International Search Report for PCT/JP2017/028575 dated Sep. 26, 2017 and English Translation thereof.
Written Opinion of International Searching Authority for PCT/JP2017/028575 dated Sep. 26, 2017.

* cited by examiner

LINEAR MOTION DEVICE

TECHNICAL FIELD

The present invention relates to a linear motion device.

BACKGROUND ART

In the prior art, there have been linear motion devices which are composed of a rail element and a linearly moving element, and which comprise endless rolling element circulation paths configured from load paths provided between the rail element and the linearly moving element, no-load paths provided to the linearly moving element, and return paths that link the load paths and the no-load paths together, the rail element and the linearly moving element moving reciprocatingly and linearly relative to each other.

PRIOR ART DOCUMENTS

[Patent Document 1] Japanese Laid-open Patent Application No. 2013-200036

SUMMARY OF THE INVENTION

Problems the Invention is Intended to Solve

The present invention provides a linear motion device in which the prior-art members that constitute the rolling elements and the endless rolling element circulation paths are improved, rigidity and load resistance are increased, and guiding precision is superior.

Means for Solving the Problems

The main points of the present invention are described below with reference to the attached drawings.

A first aspect of the present invention relates to a linear motion device in which: a linearly moving element 2 that moves linearly relative to a rail element 1 is provided; load paths 4 through which rolling elements 3 move are provided between the rail element 1 and the linearly moving element 2; the load paths 4 are made to communicate via return paths 5 with no-load paths 6 provided to the linearly moving element 2; and endless rolling element circulation paths configured from the load paths 4, the return paths 5, and the no-load paths 6 are formed in at least a left-and-right pair; said linear motion device characterized in that the rolling elements 3 are cylinders of which the length is at least three times the diameter, the rolling elements 3 are configured so as to circulate through the endless rolling element circulation paths while being rotatably held by rolling element holders 10 configured by spacers 8 provided between adjacent rolling elements 3 and belt-shaped linking elements 9 that link spacers 8 together at both ends, the no-load paths 6 are formed by placing no-load path-constituting members 12 in linear holes 11 formed in the linearly moving element 2, and the no-load path-constituting members 12 are configured such that the end surfaces of the rolling elements 3 are opened on the outward sides and the linking elements 9 of the rolling element holders 10 are exposed.

A second aspect of the present invention relates to the linear motion device of the first aspect, characterized in that gaps 7 in which the linking elements 9 of the rolling element holders 10 are placed are provided to the no-load path-constituting members 12 along the longitudinal direction of the no-load path-constituting members 12.

A third aspect of the present invention relates to the linear motion device of the first or second aspect, characterized in that the no-load path-constituting members 12 are configured by combining first half elements 13 and second half elements 14, the longitudinal ends of the first half elements 13 and second half elements 14 are provided with linking parts that link said ends together, and the first half elements 13 and the second half elements 14 are set apart without being in contact with each other in the portions placed inside the linear holes 11, configuring the no-load paths 6 and the gaps 7.

A fourth aspect of the present invention relates to the linear motion device of any of the first through third aspects, characterized in that guide members 16 that guide the rolling element holders 10 are provided between the linearly moving element 2 and the rail element 1, and the ends of the guide members 16 are provided with respective return path configurative members 17a, 17b that constitute the return paths 5.

A fifth aspect of the present invention relates to the linear motion device of the fourth aspect, characterized in that an upper and lower pair of left and right endless rolling element circulation paths are provided, the upper and lower endless rolling element circulation paths are arranged so as to intersect, and the guide members 16 arranged respectively in the upper and lower endless rolling element circulation paths are linked together via reinforcing members 18, which reinforce the guide members 16.

A sixth aspect of the present invention relates to the linear motion device of the fourth or fifth aspect, characterized in that the no-load path-constituting members 12 and the return path configurative members 17a, 17b at the ends of the guide members 16 are linked in a state in which the return paths 5 and the no-load paths 6 communicate.

Effects of the Invention

The present invention is a linear motion device that, due to being configured as described above, has higher rigidity, higher load resistance, and superior guiding precision.

BEST MODE FOR CARRYING OUT THE INVENTION

Figure 1:
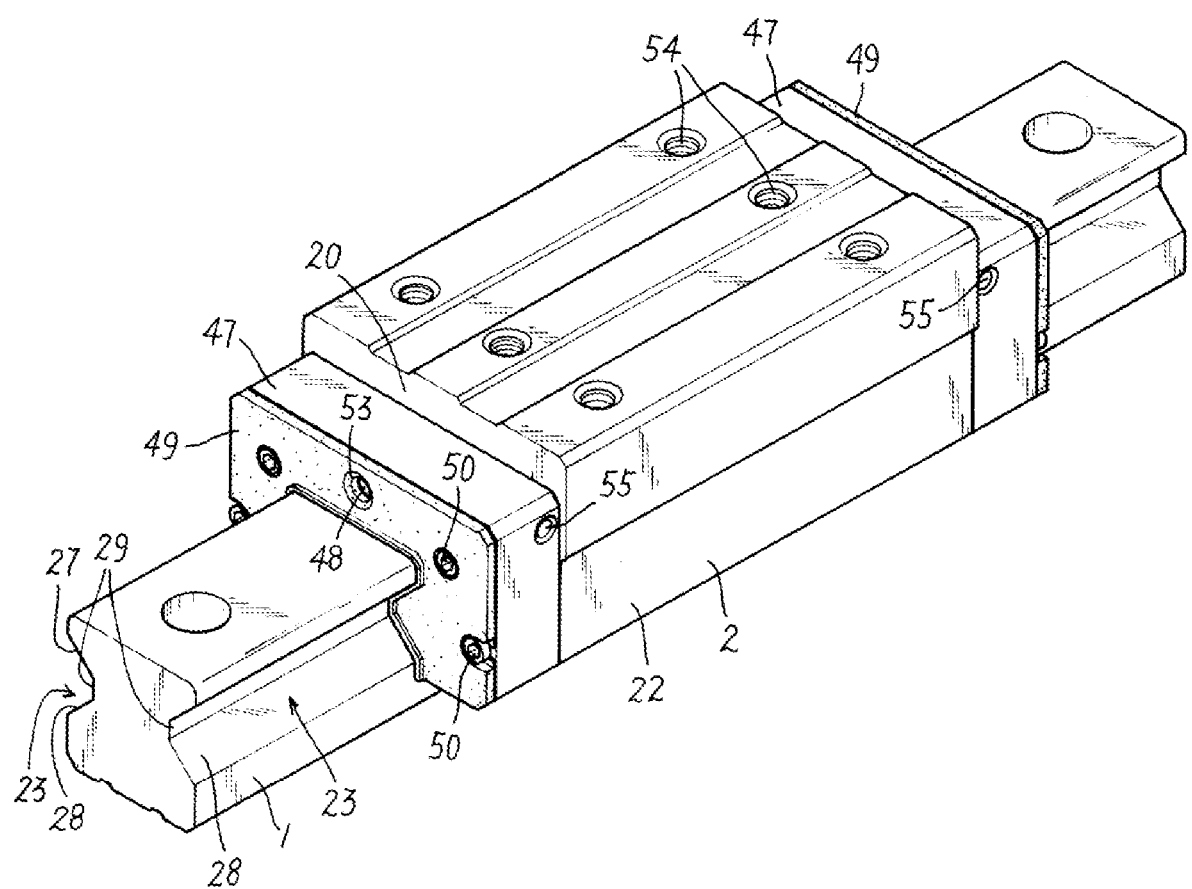
FIG. 1 is a schematic explanatory perspective view of the present example.

Preferred embodiments of the present invention are briefly described below with reference to the diagrams while indicating the effects of the present invention.

Each of the rolling elements 3 is of an oblong form in which the length is at least three times the diameter, whereby rolling elements 3 having a long contact length can be arranged densely, and the rigidity and load resistance can therefore be improved proportionally. Furthermore, due to loads being supported by the densely arranged rolling elements 3, vibration (passing vibration or waving) originating from rolling motion is also lessened and guiding precision is also improved.

When the rolling elements 3 are of an oblong form, linear holes 11 provided to a linearly moving element 2 must be proportionally enlarged in diameter in order to provide no-load paths 6, but excessively enlarging the diameter by too much leads to a decrease in the rigidity of the linearly moving element 2. There also arises a need to increase the size of the linearly moving element 2 and ensure rigidity.

In this respect, in the present invention, the no-load path-constituting members 12 are configured such that the end surfaces of the rolling elements 3 are opened on the outward sides (the sides: the widthwise ends), and belt-shaped linking elements 9 of rolling element holders 10 are exposed from the no-load path-constituting members 12, whereby the belt-shaped linking elements 9 can be brought as close as possible to the wall surfaces of the linear holes 11 of the linearly moving element 2; therefore, in comparison with a configuration in which the entire peripheries of the no-load paths are covered by the no-load path-constituting members, proportionally wider areas for placing the rolling elements 3 can be ensured, and the percentage of the lengths of the rolling elements 3 relative to the diameters of the linear holes 11 can be made as large as possible.

Therefore, even when oblong rolling elements 3 are used, the accompanying diameter enlargement of the linear holes 11 can be minimized, and a decrease in the rigidity of the linearly moving element 2 can be prevented. It is also not necessary to increase the size of the linearly moving element 2 in order to ensure rigidity.

Examples

Specific examples of the present invention are described below with reference to the diagrams.

The present example is a linear motion device in which a linearly moving element 2 that moves linearly relative to a rail element 1 is provided, load paths 4 through which rolling elements 3 move are provided between the rail element 1 and the linearly moving element 2, the load paths 4 are made to communicate via return paths 5 with no-load paths 6 provided to the linearly moving element 2, and endless rolling element circulation paths configured from the load paths 4, the return paths 5, and the no-load paths 6 are formed in at least a left-and-right pair, wherein the rolling elements 3 are cylinders of which the length is at least three times the diameter, the rolling elements 3 are configured so as to circulate through the endless rolling element circulation paths while being rotatably held by rolling element holders 10 configured by spacers 8 provided between adjacent rolling elements 3 and belt-shaped linking elements 9 that link spacers 8 together at both ends, the no-load paths 6 are formed by placing no-load path-constituting members 12 in linear holes 11 formed in the linearly moving element 2, and the no-load path-constituting members 12 are configured such that the end surfaces of the rolling elements 3 are opened on the outward sides and the linking elements 9 of the rolling element holders 10 are exposed.

Figure 2:
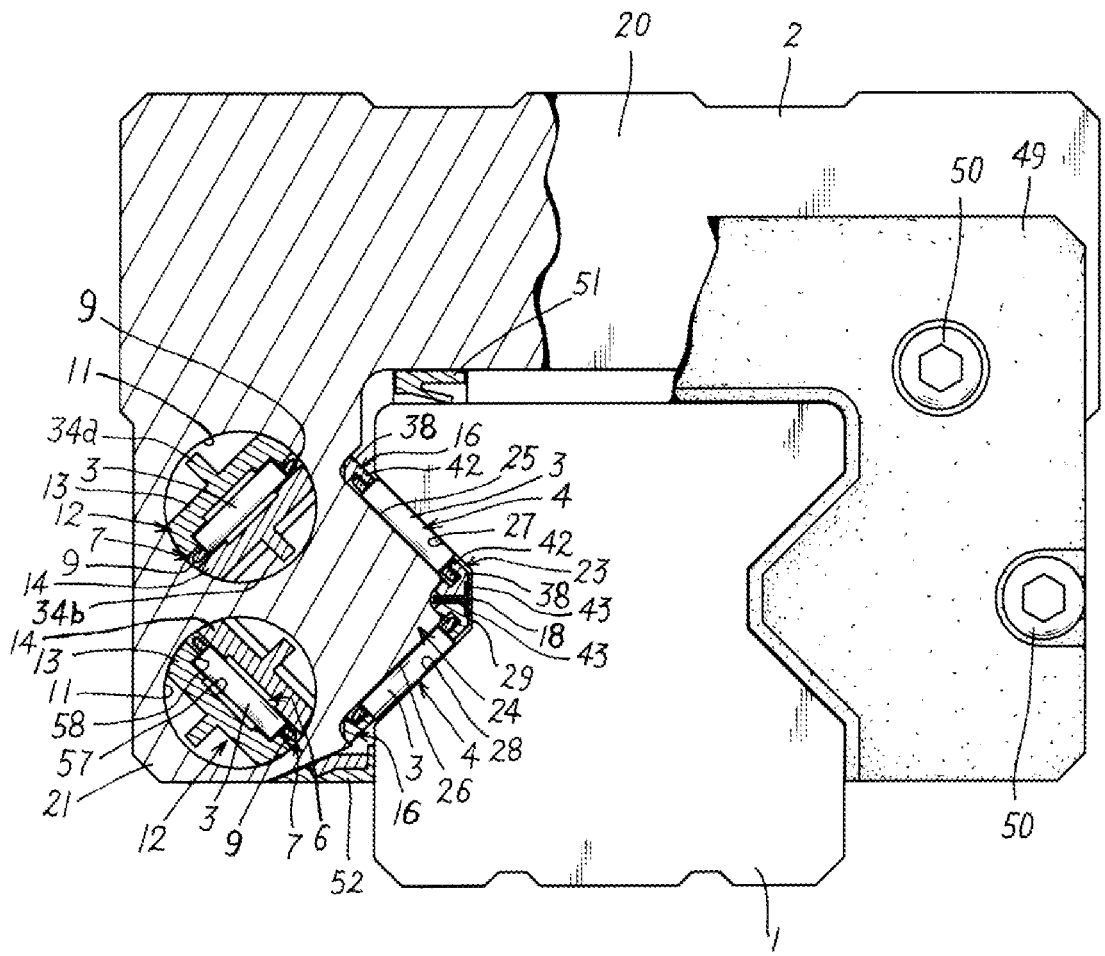
FIG. 2 is a front view with part of the present example cut away.

Specifically, as shown in FIGS. 1 and 2, the linearly moving element 2 is a U-shaped metal block element that is oriented downward when viewed in cross-section, in which sleeves 21, 22 are suspended on the left and right sides of a base 20, and the inner surfaces of the left and right sleeves 21, 22 are provided with respective protrusions 24 placed so as to fit into recesses 23, which are V-shaped when viewed in cross-section and which are extended along the longitudinal direction of the metal rail element 1 on the left and right side surfaces of the rail element 1.

Each of the protrusions 24 configured with an upper slanted surface 25 and a lower slanted surface 26 arranged in a V shape in correspondence with the recess 23, an upper inner surface 27 of each recess 23 of the rail element 1 and the upper slanted surface 25 of the corresponding protrusion 24 constitute the upper load path 4, and a lower inner surface 28 of the recess 23 and the lower slanted surface 26 of the corresponding protrusion 24 constitute the lower load path 4. That is, in the configuration of the present example, two upper and lower pairs of left and right pairs of endless rolling element circulation paths are provided. In the drawings, the symbol 29 denotes a linking surface that links the upper inner surface 27 and the lower inner surface 28.

Upper and lower linear holes 11, which are cross-sectionally circular and in which the no-load path-constituting members 12 are placed, are provided as a set in both of the left and right sleeves 21, 22, correspondingly with respect to the load paths 4.

Specifically, the no-load paths 6 that correspond to the upper load paths 4 are provided to the lower linear holes 11 (the upper endless rolling element circulation paths), and the no-load paths 6 that correspond to the lower load paths 4 are provided to the linear holes 11 (the lower endless rolling element circulation paths). That is, the upper and lower endless rolling element circulation paths are disposed so as to intersect when seen in an end surface view.

The rolling elements 3 of the present example have a length/diameter ratio of 3 or greater; specifically, 3.8 to 4.2. Prior-art rolling elements have a length/diameter ratio of about 2.0, but the configuration of the present example described below makes it possible to use rolling elements 3 having a length/diameter ratio of 3.8 to 4.2 without increasing the size of the linearly moving element 2, the load to be borne by numerous (needle) rollers that have great contact length.

The rolling elements 3 are rotatably held by rolling element holders 10 configured by spacers 8 provided between adjacent rolling elements 3 and belt-shaped linking elements 9 that link spacers 8 together at both ends.

Figure 3:
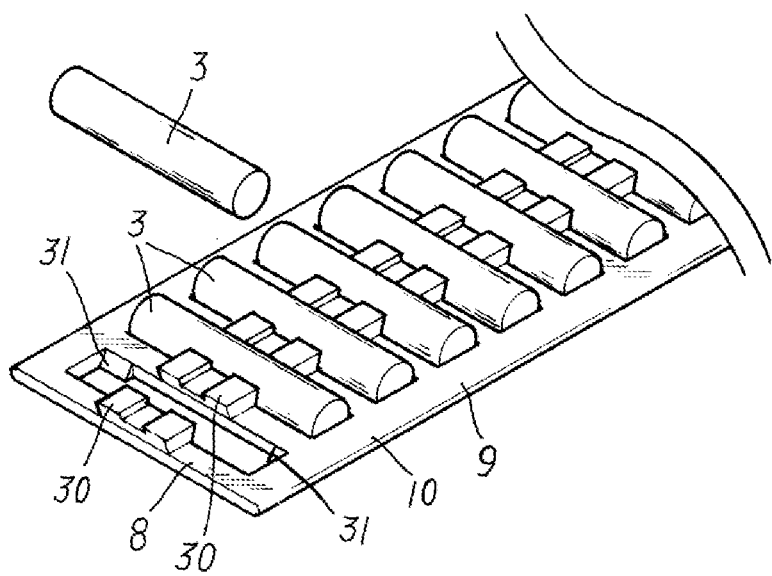
FIG. 3 is an enlarged schematic explanatory perspective view of a rolling element holder of the present example.

Specifically, as shown in FIG. 3, both ends of a spacer 8 are linked by a linking element 9 in the rolling element holder 10, which is made of a synthetic resin and assumes the shape of a flexible, belt-shaped ladder. That is, the rolling element holders 10 are belt-shaped and are provided with window holes in which the rolling elements 3 are rotatably placed at prescribed intervals. The symbols 30 denote protuberances for preventing the rolling elements 3 provided to the spacer 8 from falling out, and the symbols 31 denote projections for supporting the rolling elements, these projections being provided to each of the four corners of the window holes and having curved surfaces that curve along the peripheral surfaces of the rolling elements 3. The front surface side in FIG. 3 comes into contact with the recess 23 side of the rail element 1, and the reverse surface side comes into contact with the protrusion 24 side of the linearly moving element 2.

Each part shall be described in detail.

Figure 4:
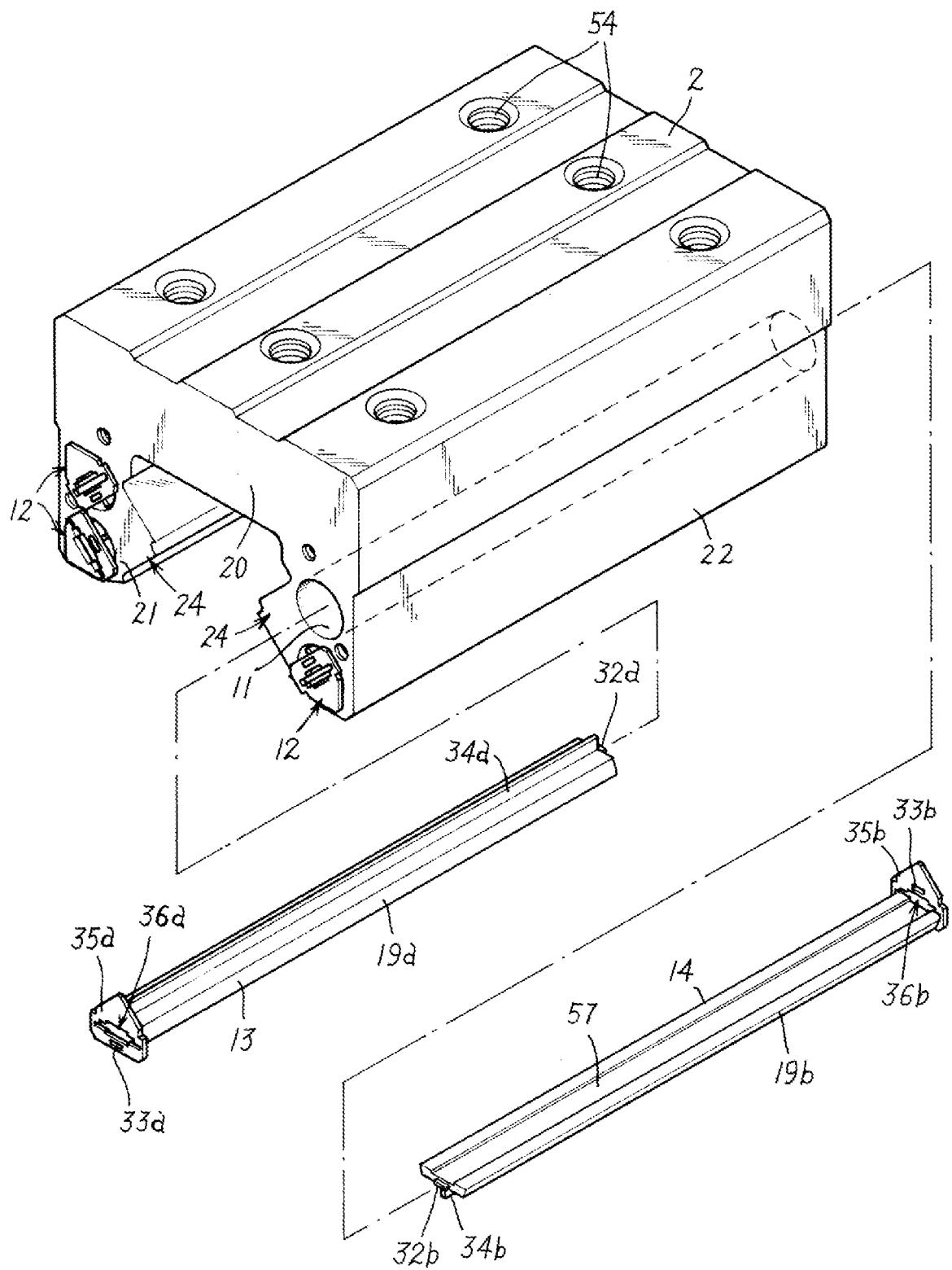
FIG. 4 is an exploded explanatory perspective view of a no-load path-constituting member of the present example

The no-load path-constituting members 12 are each configured by combining a first half element 13 and a second half element 14 inserted into a linear hole 11 formed in the linearly moving element 2, and linking parts that link the first half element 13 and the second half element 14 together are provided at both longitudinal ends thereof, as is shown in FIG. 4.

The first half elements 13 and the second half elements 14 are configured so as to be set apart without contact with each other in the portions (longitudinal center parts) placed inside the linear holes 11, excluding the longitudinal ends, with the no-load paths 6 being formed in the spaces between the longitudinal center parts of the first half elements 13 and the second half elements 14.

Specifically, the longitudinal center parts of the first half elements 13 and the second half elements 14, which are placed inside the linear holes 11, are formed from plate members 19a, 19b. The rolling elements 3 are held between the opposing inner surfaces of the plate members 19a, 19b. Additionally, depressions 57 serving as oil collectors are formed in the center parts of the inner surfaces of the plate members 19a, 19b. Additionally, in the plate members 19a of the first half elements 13, level-difference parts 58, which are wider and shallower than the oil-collecting depressions 57, are provided so as to overlap the depressions 57, and vertical end surfaces at both ends of the level-difference parts 58 are set into contact-holding surfaces that come into contact with the end surfaces of each of the rolling elements 3. That is, within the space parts between the plate members 19a, 19b, the spaces between the vertical end surfaces of the level-difference parts 58 serve as the no-load paths 6 through which the rolling elements 3 roll, and the sides outward from the vertical end surfaces of the level-difference parts 58 serve as gaps 7 in which the linking elements 9 of the rolling element holders 10 are placed.

In each of the first half elements 13, one end side of the plate member 19a is provided with a protrusion 32a that fits with a recess 33b of the second half element 14, and the other end side is provided with a recess 33a that fits with a protrusion 32b of the second half element 14. In each of the second half elements 14, one end side of the plate member 19b is provided with the recess 33b that fits with the protrusion 32a of the first half element 13, and the other end side is provided with the protrusion 32b that fits with the recess 33a of the first half element 13. The symbols 34a, 34b in the drawing denote reinforcing ribs.

The protrusions 32a, 32b of the first half elements 13 and second half elements 14 protrude horizontally outward in the ends of the plate members 19a, 19b, and the recesses 33a, 33b of the first half elements 13 and second half elements 14 are slots provided in upright plate parts 35a, 35b that are linked to the end surfaces of the plate members 19a, 19b and extended in a direction orthogonal to the extending direction of the plate members 19a, 19b. The slots are provided to positions separated a prescribed distance (approximately the diameter of the rolling elements 3) in a vertical direction from the inner surfaces of the plate members 19a, 19b.

Therefore, due to the protrusions 32a, 32b and the recesses 33a, 33b of the first half elements 13 and second half elements 14 being fitted together, the half elements are linked together such that the longitudinal center parts thereof (the inner surfaces of the plate members 19a, 19b) are set apart. The spaces between these longitudinal center parts (plate members 19a, 19b) are areas where the rolling elements 3 and the rolling element holders 10 pass through, i.e., the no-load paths 6 and the gaps 7.

The widthwise ends (outer sides of the end surfaces of the rolling elements 3) are in an opened state, and the linking elements 9 of the rolling element holders 10 are exposed from the no-load path-constituting members 12. Consequently, there are no other members between the wall surfaces of the linear holes 11 and the linking elements 9 of the rolling element holders 10, allowing for a design in which the linking elements 9 are brought closer to the wall surfaces of the linear holes 11, and allowing the areas in which the rolling elements are placed to be widened proportionally.

Passage hole parts 36a, 36b via which the no-load paths 6 and gaps 7 communicate are provided respectively in positions above the slots of the upright plate parts 35a and positions below the slots of the upright plate parts 35b. The passage hole parts 36a, 36b are configured having at least a width equal to or greater than the combined width of the no-load path 6 and the gaps 7 on both sides thereof. The upright plate parts 35a, 35b are configured so as to interlock in the hole edge parts of the linear holes 11 and to be attached in a state of contact with both ends of the linearly moving element 2.

Figure 5:
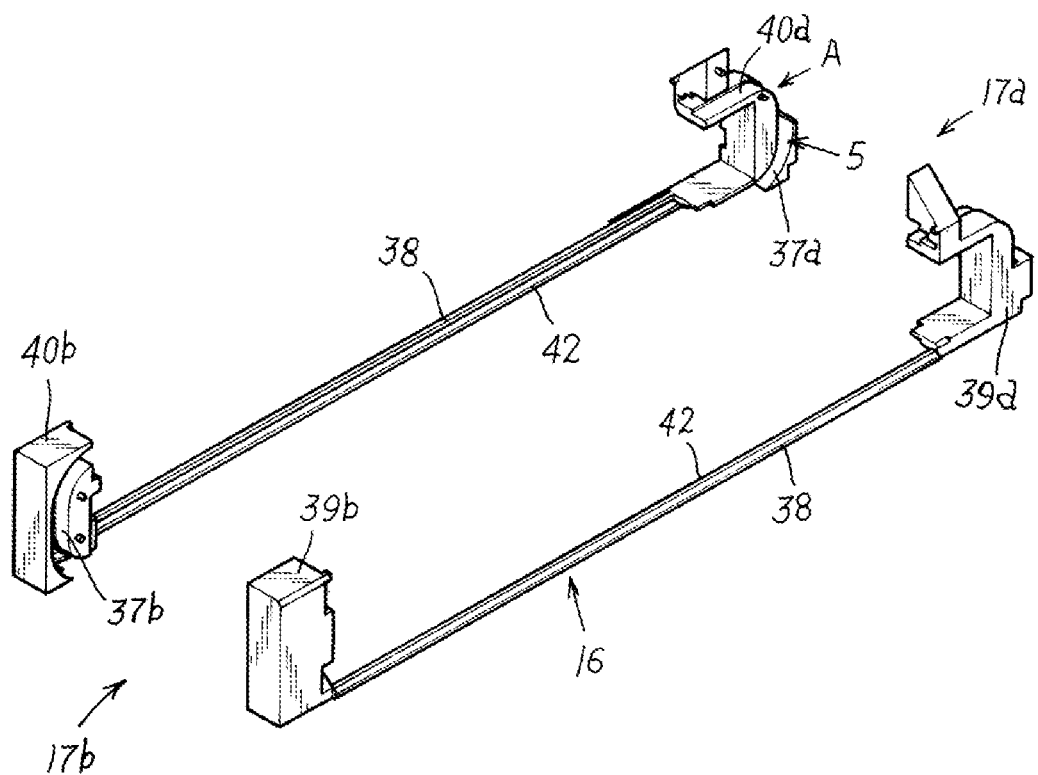
FIG. 5 is an exploded explanatory perspective view of a guide member of the present example.
Figure 6:
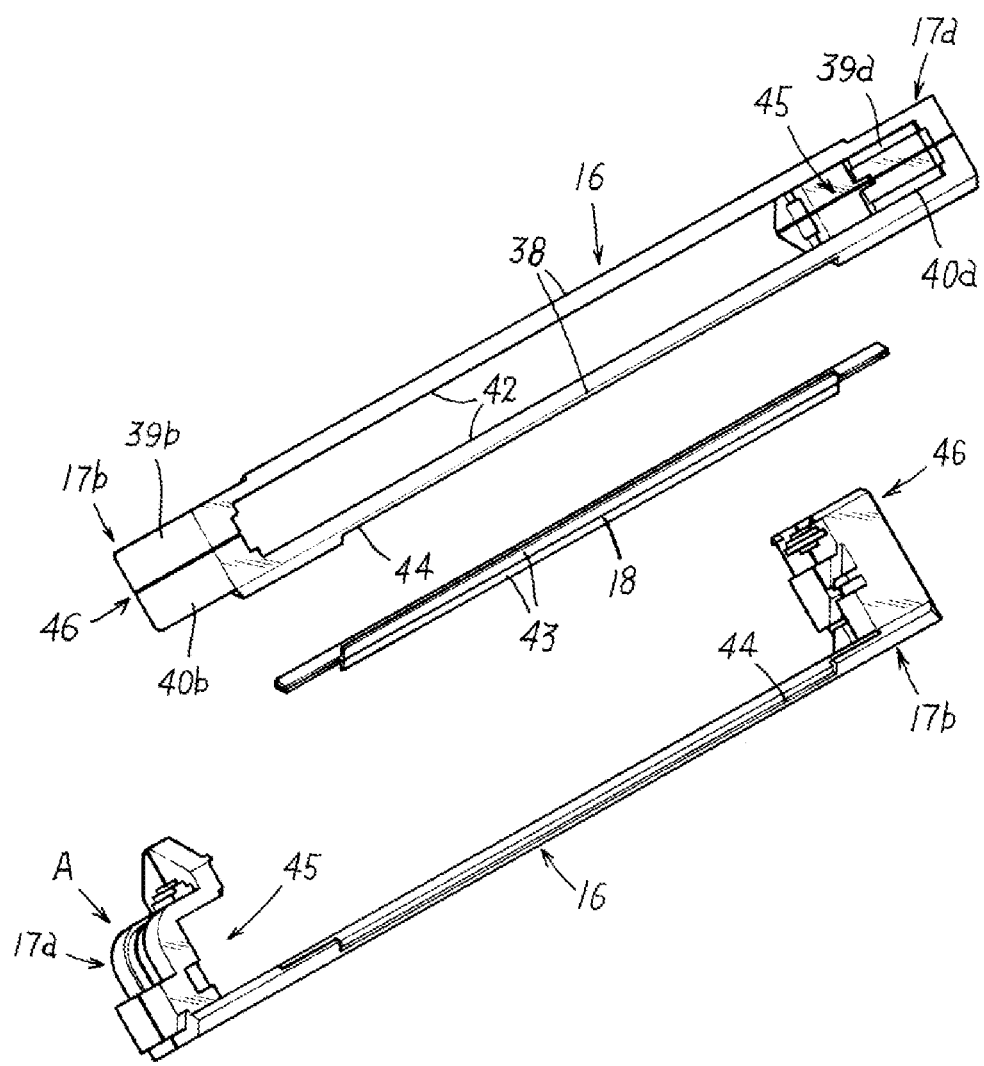
FIG. 6 is a schematic explanatory perspective view of a guide member and a reinforcing member of the present example.
Figure 7:
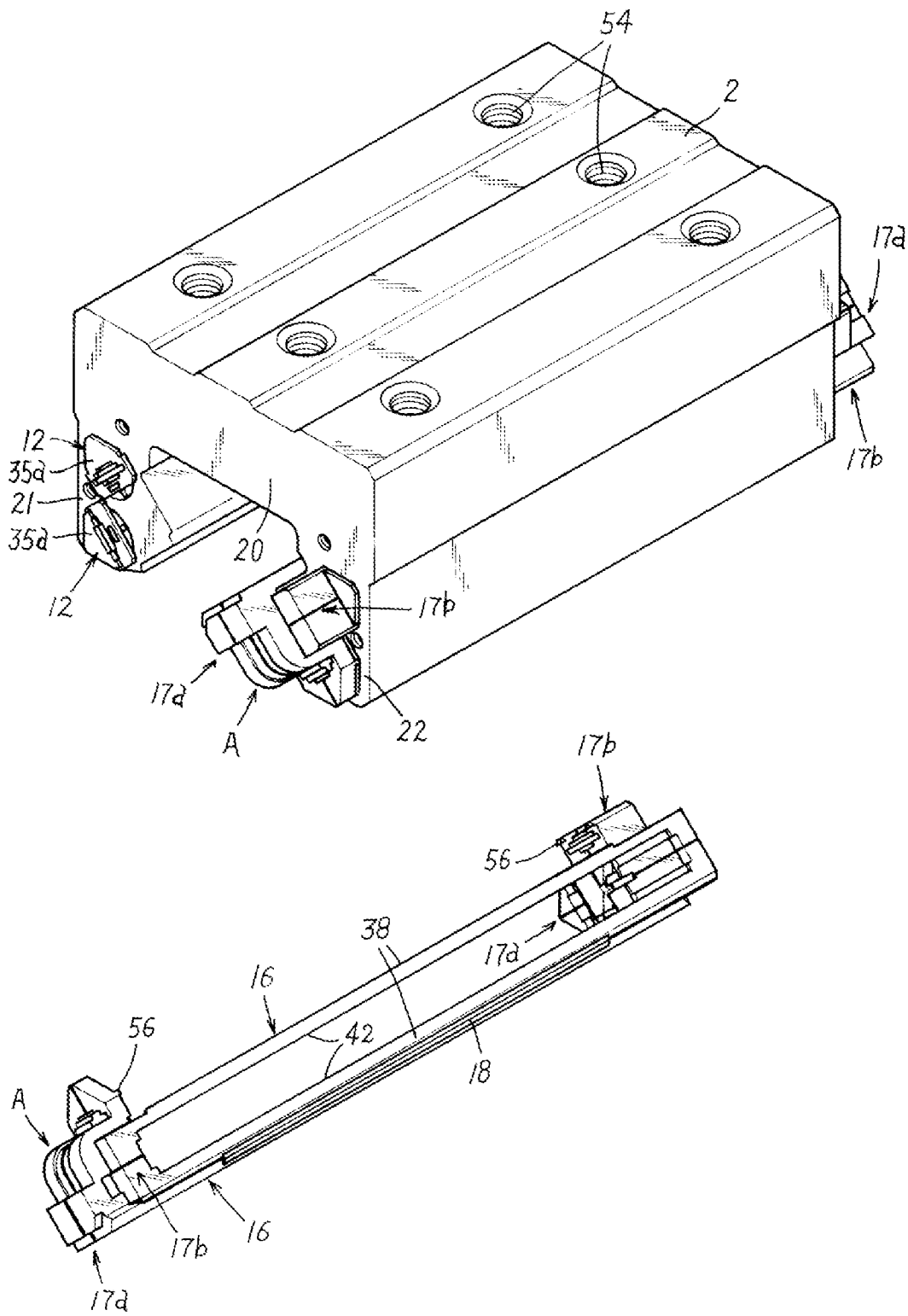
FIG. 7 is a schematic explanatory perspective view showing an attached state of a guide member of the present example.
Figure 8:
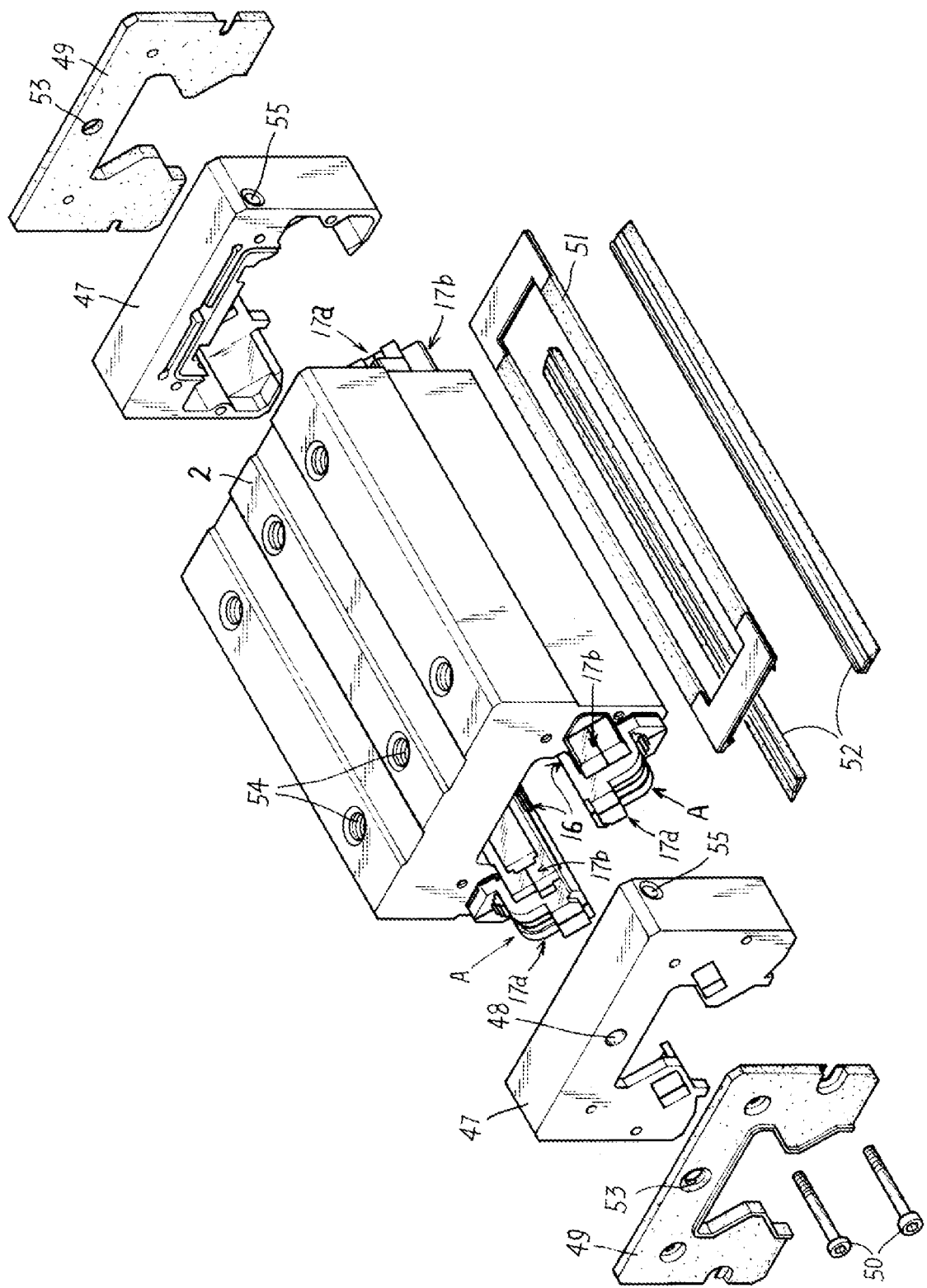
FIG. 8 is an exploded explanatory perspective view of a linearly moving element of the present example.

Guide members 16 that guide the rolling element holders 10 moving through the load paths 4 are provided between the linearly moving element 2 and the rail element 1, and return path configurative members 17a, 17b constituting the return paths 5 are integrally and respectively provided to both ends of the guide members 16, as shown in FIGS. 5 to 7.

Therefore, relative to when the guide members 16 and the return path configurative members 17a, 17b are provided separately, the borders between the load paths 4 and the return paths 5 can be made as smooth as possible, the movements of the rolling elements can be made proportionally smoother, and the reliability of the rolling element holders 10 will also improve. The work of attachment is also made proportionally easier.

The present example is configured such that the return path configurative members 17a, 17b are linked to (the upright plate parts 35a, 35b of) the no-load path-constituting members 12 of the lower or upper linear holes 11, whereby the guide members 16 are provided to the upper slanted surfaces 25 or lower slanted surfaces 26 of the protrusions 24. Additionally, the guide members 16 are attached to the linearly moving element 2, whereby the no-load path-constituting members 12 and the return path configurative members 17a, 17b at both ends of the guide members 16 are linked such that the return paths 5 and the no-load paths 6 communicate.

The return path configurative members 17a, 17b are provided with respective passage groove parts 37a, 37b through which the rolling element holders 10 pass, these passage groove parts serving as the U-shaped return paths 5 joining the load paths 4 and the no-load paths 6 together (see FIG. 5).

The guide members 16 are a pair of upper and lower bar members 38 of which both ends are integrally linked to the return path configurative members 17a, 17b, and are respectively provided to upper end positions and lower end positions of the upper slanted surfaces 25 and lower slanted surfaces 26 of the protrusions 24 of the linearly moving element 2. The bar members 38 are provided with end surface guide parts that guide the end surfaces of the rolling elements 3.

Specifically, in one of the bar members 38, a one-end-side half element 39a in which the upper part of the passage groove part 37a is formed and an other-end-side half element 39b in which the upper part of the passage groove part 37b is formed are provided at the ends, and in the other of the bar members 38, a one-end-side half element 40a in which the lower part of the passage groove part 37a is formed and an other-end-side half element 40b in which the lower part of the passage groove part 37b is formed are provided at the ends. The bar members 38 are linked together and integrated so that the passage groove parts 37a, 37b are formed, and the guide members 16 are thereby formed.

Each of the pair of upper and lower bar members 38 is provided an upright wall part 42, which is provided upright at a distance from the upper slanted surface 25 or lower slanted surface 26 of the linearly moving element 2, the distance being proportional to the space in which the linking element 9 of the rolling element holder 10 is placed, and a tip end surface of the erected wall part 42 is set into the end surface guide part (see FIG. 2). Additionally, the linking element 9 of each rolling element holder 10 is configured so as to pass through the space between the erected wall part 42 and the upper slanted surface 25 or the lower slanted surface 26. The surface of the erected wall part 42 on the side adjacent to the linking element 9 of the rolling element holder 10 smoothly continues into the outer peripheral side surface of the passage groove part 37a, 37b of the return path configurative member 17a, 17b. The inner peripheral side surface of the passage groove part 37a, 37b of the return path configurative member 17a, 17b is configured so as to smoothly join with the upper slanted surface 25 or the lower slanted surface 26.

When the length/diameter of each rolling element 3 is increased (when the areas in which the rolling elements are placed are ensured to be wide), the bar members 38 must be thinned proportionally, and the strength of the bar members 38 is sometimes a matter of concern.

Therefore, in the present example, the guide members 16 disposed respectively in the upper and lower endless rolling element circulation paths (load paths 4) are linked together via reinforcing members 18, which reinforce the guide members 16.

Each of the reinforcing members 18 is a cross-sectionally T-shaped member composed of a vertical plate part and a horizontal plate part orthogonal thereto. In the present example, the reinforcing members 18 are configured by cementing two cross-sectionally L-shaped plate members 43 together, back-to-back. The plate members 43 are configured so that the horizontal plate part is longer than the vertical plate part. In the drawings, the symbol 44 denotes a groove for use in placing a reinforcing member.

As shown in FIG. 6, the return path configurative member 17a on one end side of each of the guide members 16 is provided with a fitting recess 45 into which fits a fitted part 46, which is the outer periphery of the return path configurative member 17b at the other end side of another guide member 16. The fitting recesses 45 and the fitted parts 46 are provided so that when these parts are fitted together, the load path 4 and the return path 5 configured by the joined guide members come to be in an intersecting positional relationship.

Therefore, the fitting recess 45 and the fitted part 46 are fitted together so that the reinforcing member 18 is held between the upper and lower guide members 16, whereby the guide members 16 can be integrated as shown in FIG. 7 and can be attached in a simple manner in this state to the linearly moving element 2 by interlocking the open-side end surfaces of the return path configurative members 17a, 17b with the end surfaces of the no-load path-constituting members 12. In the present example, the guide members 16 are attached by causing interlocking protuberances 56 of the return path configurative members 17a, 17b to interlock with interlocked parts of the upright plate parts 35a, 35b of the no-load path-constituting members 12.

A part (portion A) of each return path configurative member 17a is cut away, yielding a configuration in which there is no outer peripheral side surface of the return path 5. This is because a part of the outer peripheral side surface of the return path 5 is provided in the inner surface of an end cap 47, which is provided to the outer sides of the return path configurative members 17a, 17b so as to fit these members together. That is, the return path 5 is formed by the return path configurative members 17a, 17b and the end cap 47. The end cap 47 is provided with an oil supply hole 48 for supplying grease, etc., which can be supplied to the return path 5 through an oil supply path inside the end cap 47. The outer side of the end cap 47 is provided with an end surface seal member 49, which is made of a synthetic resin and which has an opening part 53 that exposes the oil supply hole 48.

In the drawings, the symbol 50 denotes an attachment screw for attaching the end cap 47 and the end surface seal member 49 to the linearly moving element 2, 51 denotes an upper seal member, 52 a lower seal member, 54 a fixing hole for fixing an attached object, and 55 an oil supply hole formation hole for forming an oil supply hole by additional machining as necessary.

Because the present example is configured as described above, the rolling elements 3 each have a long and thin shape of which the length is at least three times the diameter, whereby rolling elements 3 having great contact length can be densely arranged, and rigidity and load resistance can be improved proportionally. Furthermore, due to loads being borne by the densely arranged rolling elements 3, vibration (passing vibration or waving) originating from rolling motion is lessened and guiding precision is also improved.

Due to the configuration in which the widthwise ends of the no-load paths 6 are opened and the belt-shaped linking elements 9 of the rolling element holders 10 are exposed from the no-load path-constituting members 12, the belt-shaped linking elements 9 can be brought as close as possible to the wall surfaces of the linear holes 11 of the linearly moving element 2; therefore, in comparison with a configuration in which the entire peripheries of the no-load paths are covered by the no-load path-constituting members, proportionally wider areas for placing the rolling elements 3 can be ensured, and the percentage of the lengths of the rolling elements 3 relative to the diameters of the linear holes 11 can be made as large as possible.

Therefore, even when long and thin rolling elements 3 are used, the accompanying diameter enlargement of the linear holes 11 can be minimized, and a decrease in the rigidity of the linearly moving element 2 can be prevented. It is also not necessary to increase the size of the linearly moving element 2 in order to ensure rigidity.

Consequently, the present example yields higher rigidity, higher load resistance, and superior guiding precision.

The invention claimed is:

1. A linear motion device in which: a linearly moving element that moves linearly relative to a rail element is provided; load paths through which rolling elements move are provided between the rail element and the linearly moving element; the load paths are made to communicate via return paths with no-load paths provided to the linearly moving element; and endless rolling element circulation paths configured from the load paths, the return paths, and the no-load paths are formed in at least a left-and-right pair; said linear motion device characterized in that the rolling elements are cylinders of which the length is at least three times the diameter, the rolling elements are configured so as to circulate through the endless rolling element circulation paths while being rotatably held by rolling element holders configured by spacers provided between adjacent rolling elements and belt-shaped linking elements that link the spacers together at both ends, the no-load paths are formed by placing no-load path-constituting members in linear holes formed in the linearly moving element, the no-load path-constituting members are opened at the sides and set into gaps having a prescribed length in which the linking elements of the rolling element holders are placed, the linking elements of the rolling element holders are exposed from these gaps, and with the no-load path-constituting members having been placed in the linear holes, the linking elements are provided so as to face and to be in proximity to the wall surfaces of the linear holes.

2. The linear motion device according to claim 1, characterized in that the no-load path-constituting members are configured by combining first half elements and second half elements, the ends of the first half elements and second half elements are provided with linking parts that link said ends together, and the first half elements and the second half elements are separated without being in contact with each other in the portions placed inside the linear holes, configuring the no-load paths and the gaps.

3. The linear motion device according to claim 1, characterized in that the gaps are made to extend along the longitudinal direction of the no-load path-constituting members.

4. The linear motion device according to claim 3, characterized in that the no-load path-constituting members are configured by combining first half elements and second half elements, the ends of the first half elements and second half elements are provided with linking parts that link said ends together, and the first half elements and the second half elements are separated without being in contact with each other in the portions placed inside the linear holes, configuring the no-load paths and the gaps.

5. The linear motion device according to claim 1, characterized in that guide members that guide the rolling element holders are provided between the linearly moving element and the rail element, and the ends of the guide members are provided with respective return path configurative members that constitute the return paths.

6. The linear motion device according to claim 5, characterized in that the no-load path-constituting members and the return path configurative members at the ends of the guide members are linked in a state in which the return paths and the no-load paths communicate.

7. The linear motion device according to claim 5, characterized in that an upper and lower pair of left and right endless rolling element circulation paths are provided, the upper and lower endless rolling element circulation paths are arranged so as to intersect, and the guide members arranged respectively in the upper and lower endless rolling element circulation paths are linked together via reinforcing members, which reinforce the guide members.

8. The linear motion device according to claim 7, characterized in that the no-load path-constituting members and the return path configurative members at the ends of the guide members are linked in a state in which the return paths and the no-load paths communicate.

* * * * *